(12) United States Patent
Abel et al.

(10) Patent No.: US 11,713,581 B2
(45) Date of Patent: Aug. 1, 2023

(54) DRYWALL JOINT TOOL

(71) Applicant: Abel SeamPro, LLC, Cape Girardeau, MO (US)

(72) Inventors: Marcus Allen Abel, Kansas City, MO (US); Gary R. Hannah, Shawnee, KS (US)

(73) Assignee: Marcus Allen Abel, Kansas City, MO (US)

( * ) Notice: Subject to any disclaimer, the term of this patent is extended or adjusted under 35 U.S.C. 154(b) by 322 days.

(21) Appl. No.: 17/000,028

(22) Filed: Aug. 21, 2020

(65) Prior Publication Data

US 2021/0054635 A1     Feb. 25, 2021

Related U.S. Application Data

(60) Provisional application No. 62/890,722, filed on Aug. 23, 2019.

(51) Int. Cl.
| | |
|---|---|
| *E04F 21/165* | (2006.01) |
| *E04F 21/00* | (2006.01) |
| *B25F 5/00* | (2006.01) |
| B23B 45/02 | (2006.01) |
| B23B 45/00 | (2006.01) |

(52) U.S. Cl.
CPC ............ *E04F 21/165* (2013.01); *B25F 5/001* (2013.01); *E04F 21/0046* (2013.01); *B23B 45/008* (2013.01); *B23B 45/02* (2013.01)

(58) Field of Classification Search
CPC ..... E04F 21/00; E04F 21/165; E04F 21/0046; E04F 21/0061; E04F 21/1652; E04F 21/1657; B23C 1/20
See application file for complete search history.

(56) References Cited

U.S. PATENT DOCUMENTS

| | | | | |
|---|---|---|---|---|
| 2,991,824 A | * | 7/1961 | Loechl | E04C 2/043 156/347 |
| 3,180,058 A | * | 4/1965 | Paulw | E04C 2/043 52/447 |
| 3,233,301 A | * | 2/1966 | Paulw | B28B 11/08 101/23 |
| 4,208,239 A | * | 6/1980 | Lass | B44C 7/06 156/577 |
| 4,584,224 A | * | 4/1986 | Schneller | B28B 11/0863 156/45 |
| 4,920,651 A | * | 5/1990 | Schmidt | B27D 5/006 30/484 |

(Continued)

*Primary Examiner* — Kyle J. Walraed-Sullivan
(74) *Attorney, Agent, or Firm* — Law Office of Mark Brown, LLC; Mark E. Brown

(57) ABSTRACT

A drywall joint tool includes a housing with upper and lower surfaces and an interior. A drivetrain is mounted in said interior and originates at a drive input shaft. The drivetrain reduces the rotational speed and increases the torque force from the drive input shaft to multiple rollers depending downwardly from the housing lower surface. A guide fence also depends downwardly from the housing lower surface and includes a guide wall. The spacing between the guide rollers in the guide wall correspondence to nominal and compressed thicknesses of a gypsum board panel along a cut edge traversed by the tool. In an alternative embodiment, four guide rollers are provided.

13 Claims, 11 Drawing Sheets

(56) References Cited

U.S. PATENT DOCUMENTS

| | | | | |
|---|---|---|---|---|
| 5,304,276 | A * | 4/1994 | MacLeod | B29C 63/0013 156/701 |
| 6,230,469 | B1 * | 5/2001 | Santa Cruz | E04F 13/06 52/745.1 |
| 7,223,311 | B2 * | 5/2007 | Conboy | B28B 11/16 264/296 |
| 8,572,827 | B1 * | 11/2013 | Chou | E04F 21/0053 227/155 |
| 8,814,555 | B1 * | 8/2014 | Hensley, Sr. | E04F 21/18 425/363 |
| 11,424,604 | B1 * | 8/2022 | Mon | H02G 3/12 |
| 2002/0040561 | A1 * | 4/2002 | Henits | E04F 21/00 52/DIG. 1 |
| 2002/0062551 | A1 * | 5/2002 | Jacoby | B21D 53/745 29/798 |
| 2002/0108342 | A1 * | 8/2002 | Henits | E04F 13/042 52/417 |
| 2004/0081524 | A1 * | 4/2004 | Barnett | B23C 3/30 409/178 |
| 2005/0056072 | A1 * | 3/2005 | Schmidt | E04F 19/022 72/325 |
| 2005/0180826 | A1 * | 8/2005 | Barnett | B23C 3/30 409/132 |
| 2006/0185151 | A1 * | 8/2006 | Barnett | B23C 3/30 409/137 |
| 2015/0167312 | A1 * | 6/2015 | Morrone | B28B 11/0863 425/363 |
| 2019/0169862 | A1 * | 6/2019 | Resnick | E04F 21/1652 |
| 2019/0316366 | A1 * | 10/2019 | Thackery | B25B 27/146 |

\* cited by examiner

DRYWALL JOINT TOOL

CROSS-REFERENCE TO RELATED APPLICATIONS

This application is a nonprovisional of and claims priority in U.S. Provisional Patent Application No. 62/890,722, filed Aug. 23, 2019, which is incorporated herein by reference.

BACKGROUND OF THE INVENTION

1. Field of the Invention

The present invention relates generally to a tool for preparing gypsum board or drywall panel joints, and particularly to a tool for compressing the gypsum board panels along their cut edges.

2. Discussion of the Related Art

In construction, interior walls are commonly constructed with finish layers of gypsum board panels. Typical gypsum board panels are manufactured with tapered edges to accommodate joint tape and finish compound, i.e., "mud." The tapered configurations provide relatively flat, smooth-finish surfaces after the excess mud is sanded. Such flat, smooth surfaces accommodate paint and wall coverings to achieve relatively high levels of finish.

Drywall construction normally involves field-cutting multiple panels to fit, creating non-factory cut edges, which lack the factory-formed tapered edges. Finishing the joints between such full-thickness cut edges tends to build up slight protrusions due to the thicknesses of the tape and mud. Such field-created protrusions compromise the flat, smooth aesthetics of drywalls.

The drywall joint tool of the present invention addresses these concerns by providing a tool configured for efficiently and uniformly compressing field-cut gypsum board panel edges. Previously, there has not been available a drywall joint tool with the advantages and features of the present invention.

SUMMARY OF THE INVENTION

In the practice of an aspect of the present invention, a drywall joint tool is provided including a housing configured for holding by an operator. Multiple rollers protrude from the housing and are configured for gripping and compressing gypsum board panel edges. The housing contains a drivetrain including gears, which are driven by motorized drive source. For example, an electric drill can provide the motorized drive source and connect to the drivetrain via a chuck and driveshaft. Alternatively, an electric drive motor with forward and reverse modes of operation can be integrally incorporated in the housing. Such drills and drive motors can utilize AC current or DC batteries, which can be rechargeable.

BRIEF DESCRIPTION OF THE DRAWINGS

The drawings constitute a part of this specification and include exemplary embodiments of the present invention and illustrate various objects and features thereof.

DETAILED DESCRIPTION OF THE INVENTION

I. Introduction and Environment

Figure 1:
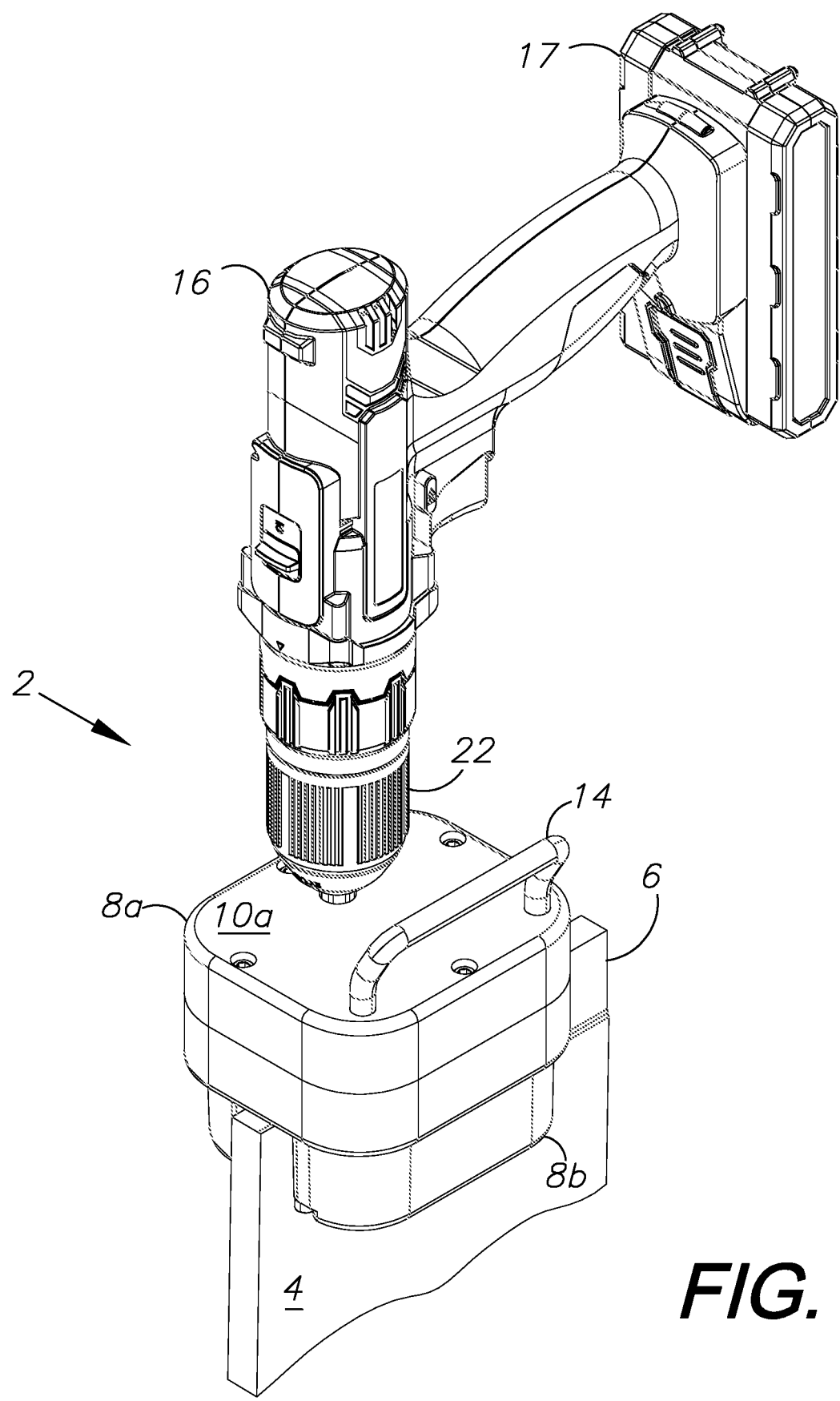
FIG. 1 is a perspective view of a drywall joint tool comprising a preferred embodiment or aspect of the present invention, shown compressing a drywall panel edge.
Figure 2:
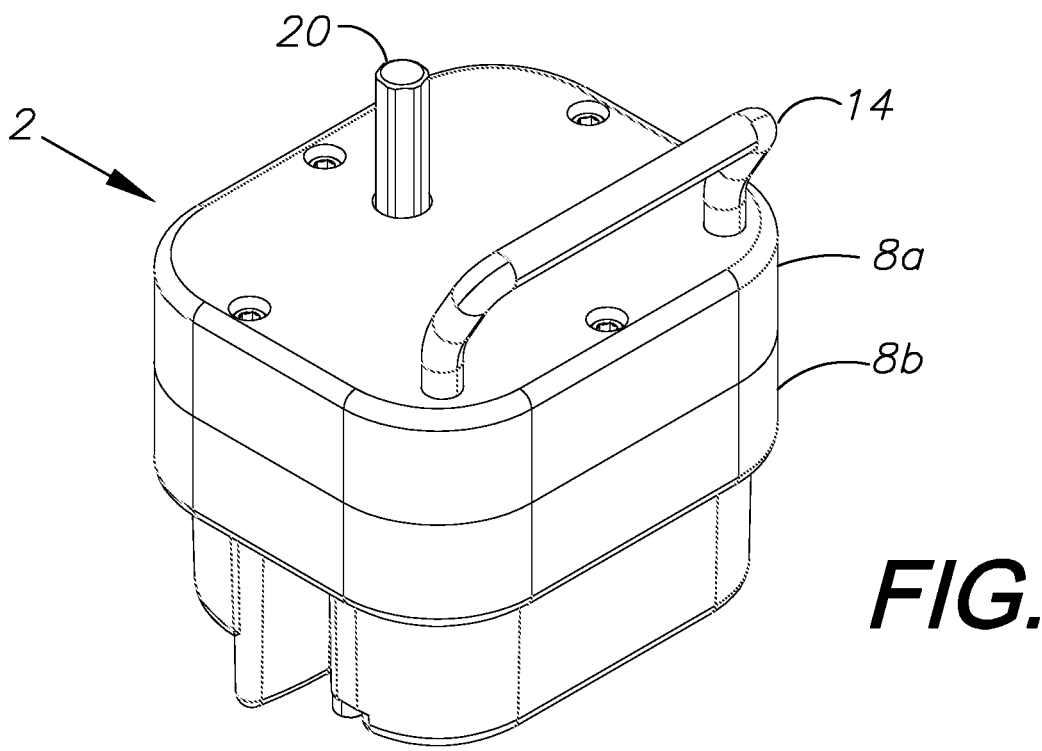
FIG. 2 is an upper, perspective view thereof.
Figure 3:
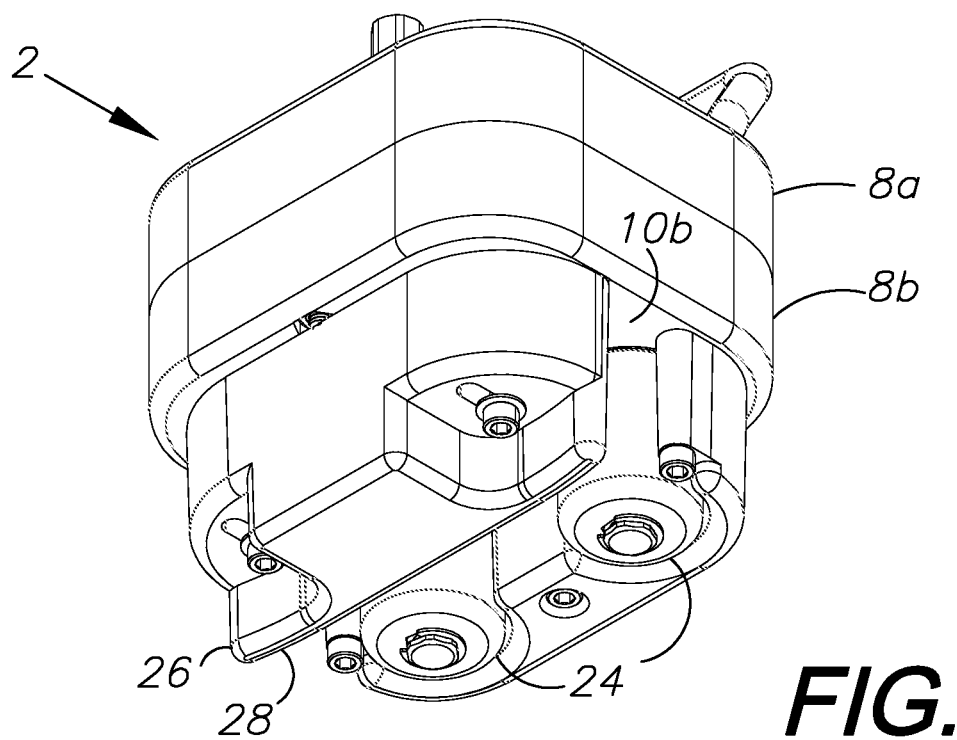
FIG. 3 is a lower, perspective view thereof.
Figure 4:
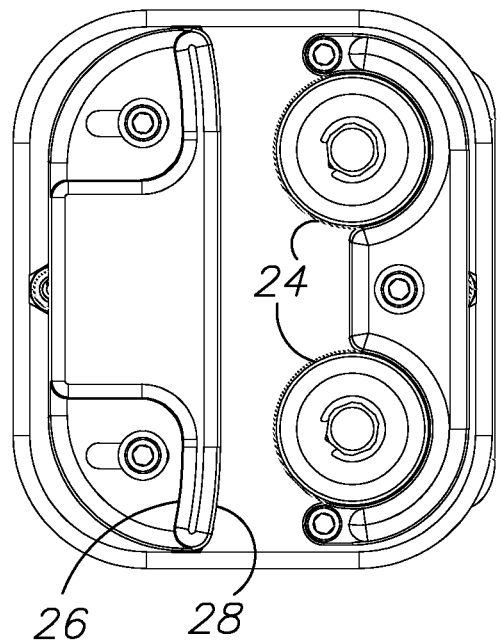
FIG. 4 is a bottom plan view thereof, particularly showing a pair of rollers and an adjustable guide fence.
Figure 5:
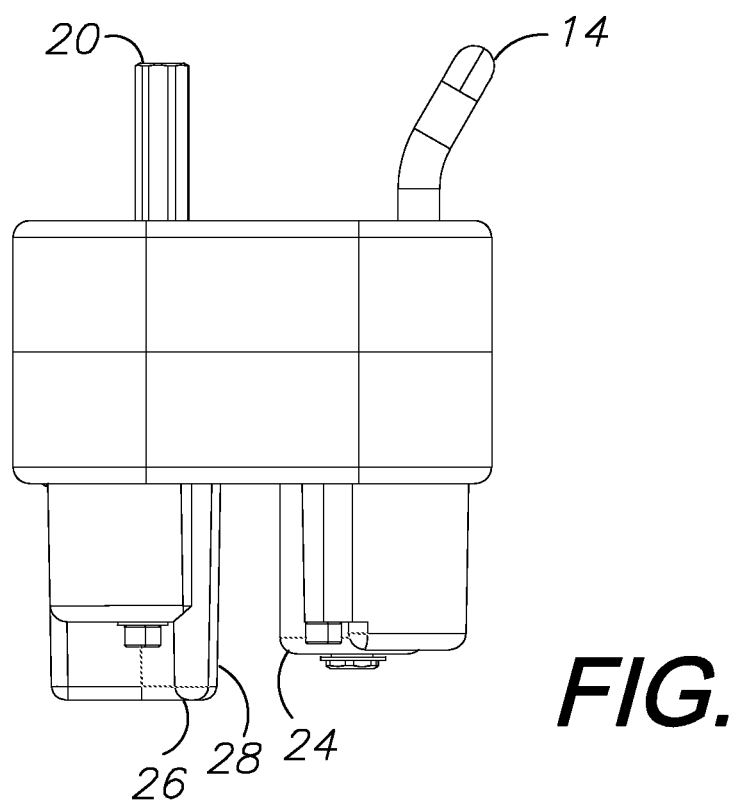
FIG. 5 is an end, elevational view thereof.
Figure 6:
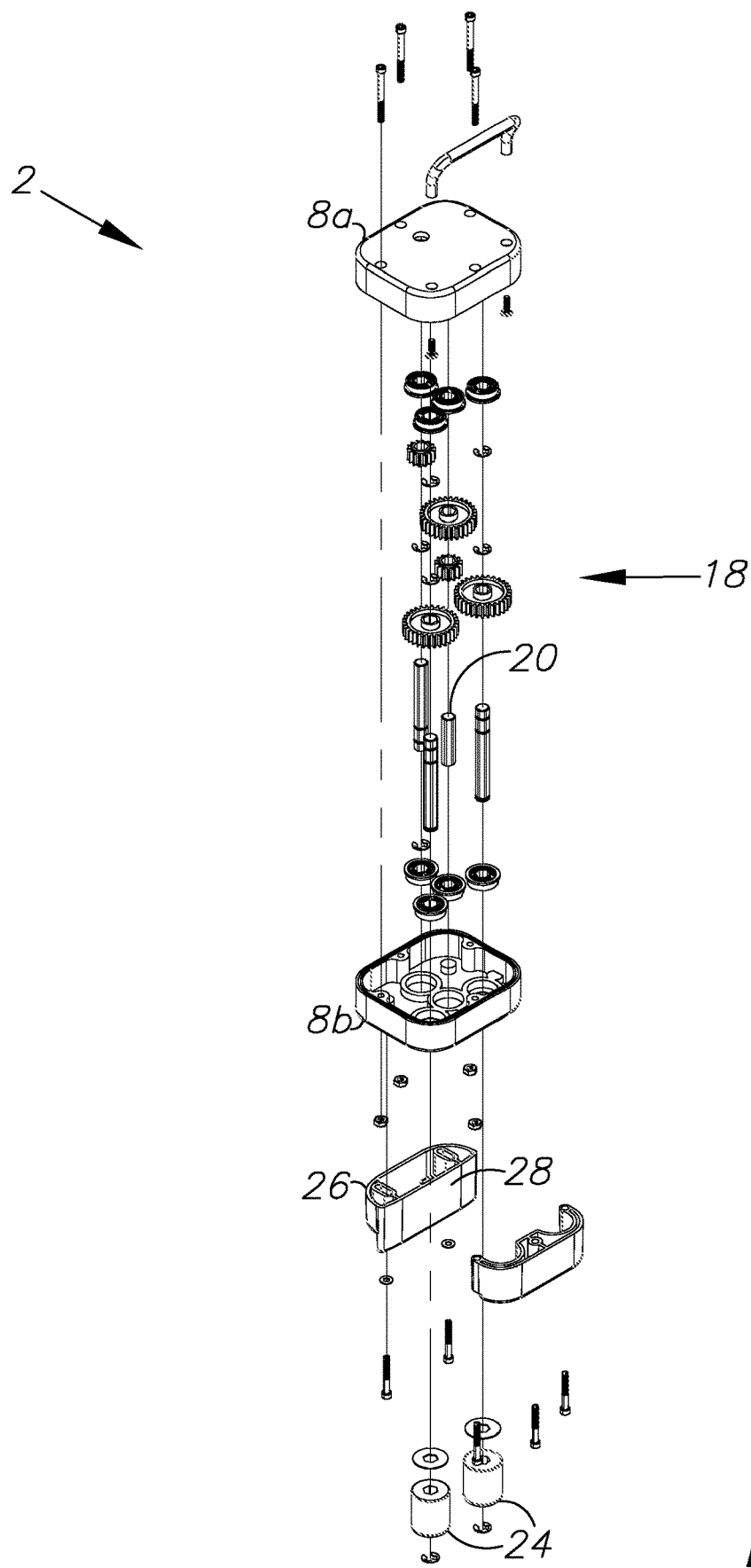
FIG. 6 is an exploded view thereof.

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Drywall Joint Tool 2

Referring to the drawings in more detail, the reference numeral 2 generally designates a drywall joint tool embodying an aspect or example of the present invention. The tool 2 is particularly configured for compressing a gypsum board (drywall) panel 4 along a cut edge 6 thereof. The tool 2 generally includes a housing 8 comprising upper and lower housing sections 8*a*, 8*b* with respective housing upper and lower surfaces 10*a*, 10*b*. The housing sections 8*a*, 8*b* enclose a housing interior 12. A handle 14 is mounted on and extends upwardly from the upper surface 10*a* and is positioned whereby an operator can simultaneously hold the tool 2 with the handle 14 and operate an electric drill 16. The drill 16 is preferably variable-speed reversible (VSR) and can be AC-powered or DC-powered. A portable, DC-powered drill can include a rechargeable battery unit 17. In an alternative aspect or embodiment of the present invention, a drive motor can be integrally incorporated in the housing 8 for a self-contained, stand-alone drywall joint tool.

The housing interior 12 receives a drivetrain 18 originating at an input driveshaft 20 extending upwardly from the housing upper surface 10*a* and configured for coupling with a drill chuck 22. The drivetrain 18 preferably comprises multiple gear sets, which collectively reduce the rotational speed at the input driveshaft 20 and correspondingly increase the output torque, which rotationally drives a pair of rollers 24 extending downwardly from the housing lower surface 10b. A guide fence 26 is adjustably mounted on the housing lower surface 10b. The guide fence 26 includes a guide wall 28 which is spaced from the rollers 24 by approximately the thickness of the gypsum board panel 4. The guide fence 4 can be finely adjusted to optimize the compression of the gypsum board cut edge 6. An adjustable-width guide slot is formed between the rollers 24 and the guide wall 28. The guide fence has slightly curved portions for guiding the panel cut edge 6 through compression by the rollers 24.

III. Operation

Drywall construction of interior walls and partitions generally follows the rough-in and framing construction phases. Common gypsum board (drywall) panels for residential and commercial construction are nominally 4 feet wide and 8-10 feet long. Standard thicknesses are generally in the range of about ⅜ to ⅝ inches. Gypsum board panels used in residential and commercial construction can be fabricated in various sizes from different materials. For example, water-resistant, fire-retardant and other special-purpose panels are commonly specified. The joint construction tool of the present invention is adjustable to accommodate a variety of panel thicknesses.

Factory panels are commonly fabricated with pre-compressed edges to accommodate joint compound and tape layers where the panels abut. Field-cut panels, on the other hand, have nominal-thickness cut edges, which the drywall joint tool of the present invention can compress for enabling smooth, flat, finished surfaces. Typical projects require field-cutting multiple drywall panels to cover the finished, interior surfaces. A drywall installer places the tool on the cut edges 6 requiring compression for finishing joints where adjacent panels abut. The operator-installer grasps the handle 14 with one hand and operates the drill 16 with the other while guiding the tool 2 along the length of the cut edge 6. Such compressed-edge panels can be finished using standard tape and finishing compound techniques and materials.

Figure 7:
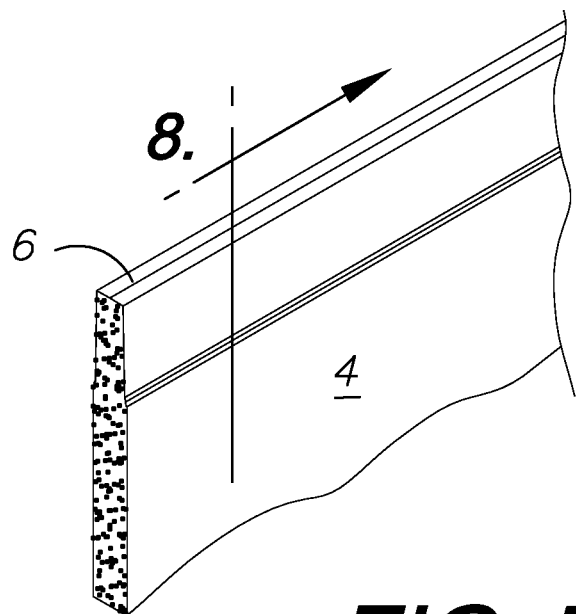
FIG. 7 is a perspective view of a gypsum board panel edge compressed by the drywall joint tool of the present invention.
Figure 8:
FIG. 8 is a cross-sectional view of the compressed gypsum board panel edge, taken generally along line 8 in FIG. 7.
Figure 9:
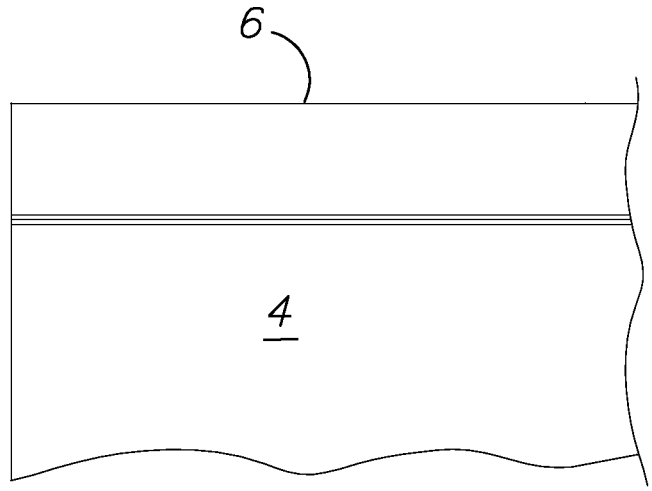
FIG. 9 is an elevation view of the gypsum board panel with a compressed edge.
Figure 10:
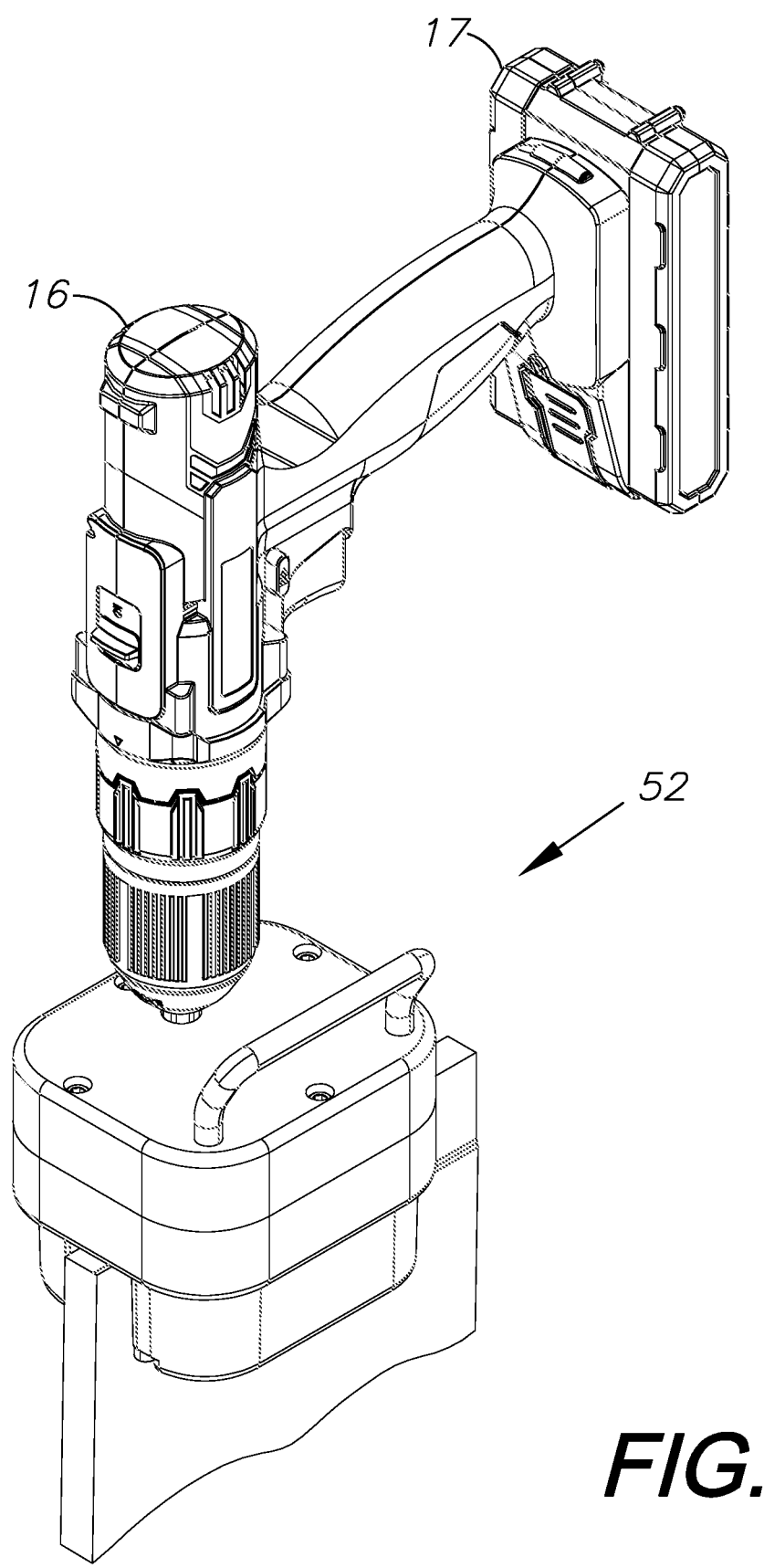
FIG. 10 is a perspective view of a drywall joint tool comprising a modified or alternative embodiment of the present invention including four compression rollers, shown compressing a gypsum board panel edge.
Figure 11:
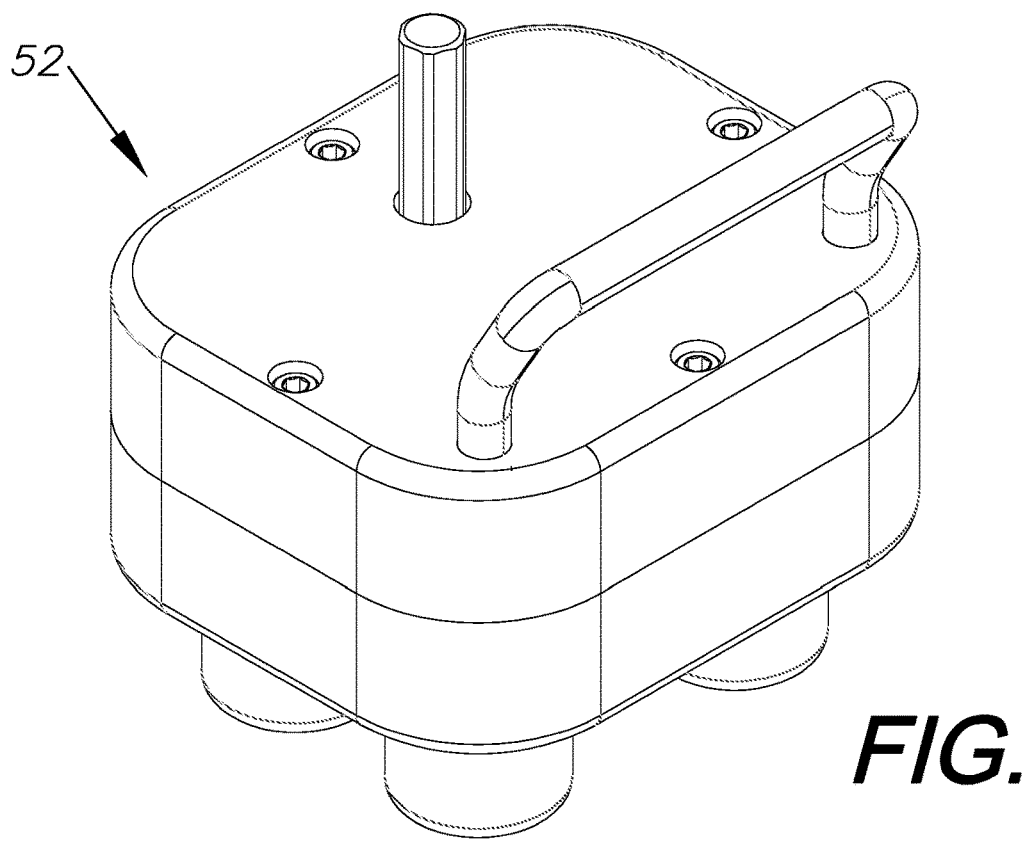
FIG. 11 is an upper perspective view thereof.
Figure 12:
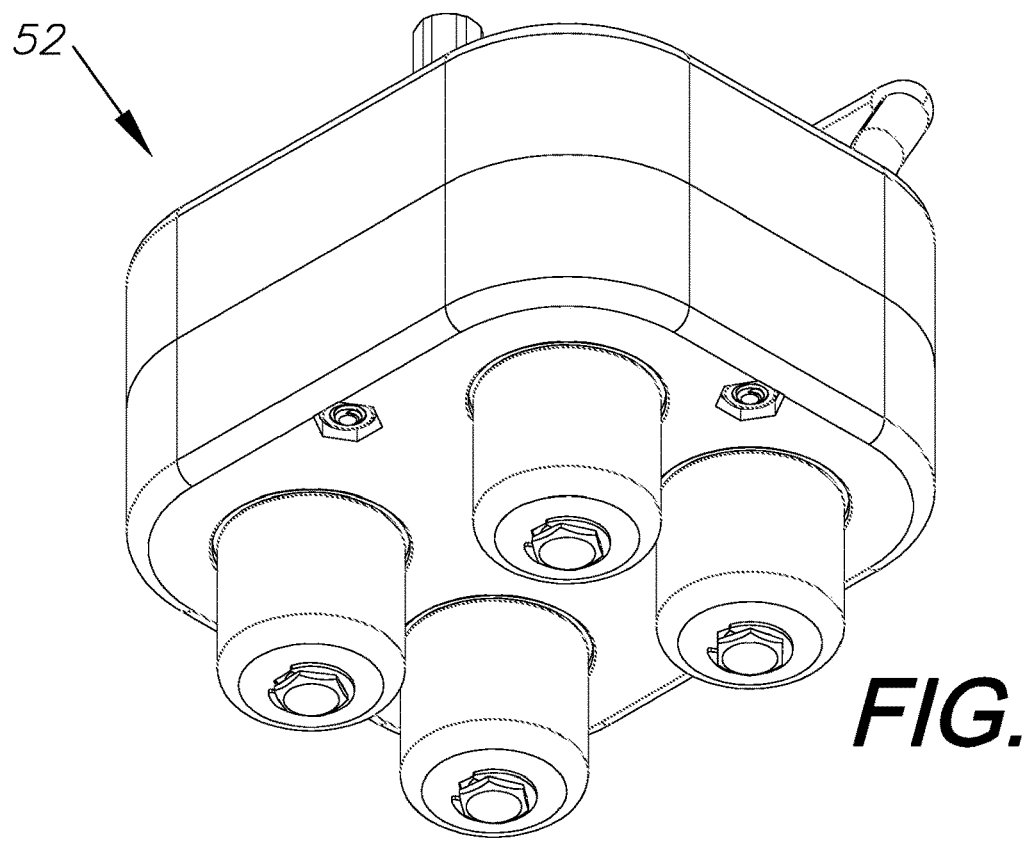
FIG. 12 is a lower perspective view thereof.
Figure 13:
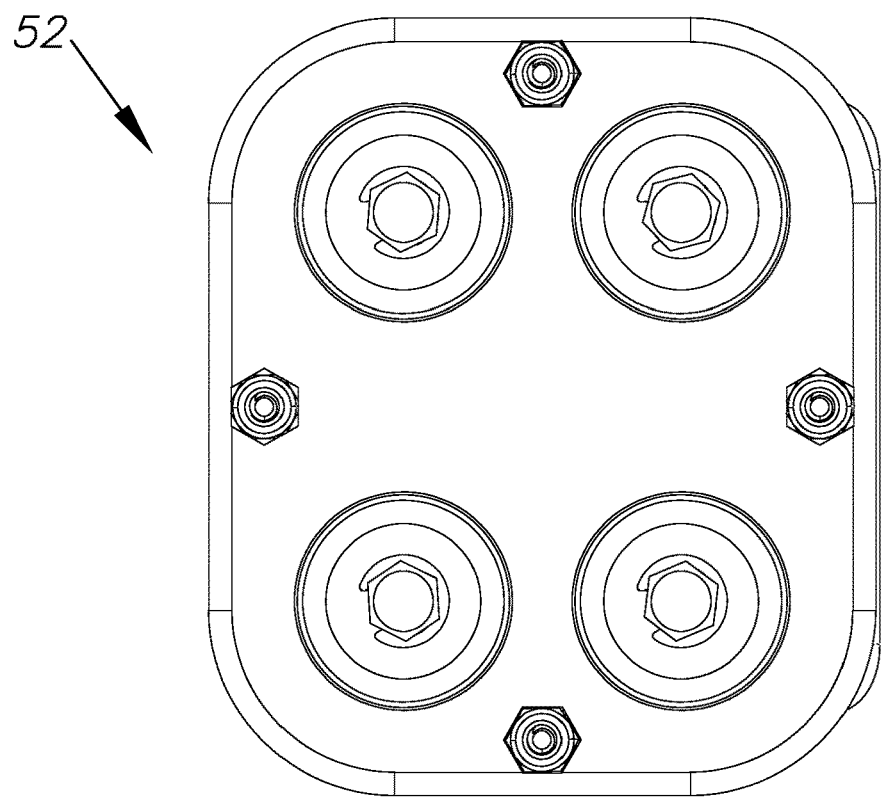
FIG. 13 is a lower plan view thereof.
Figure 14:
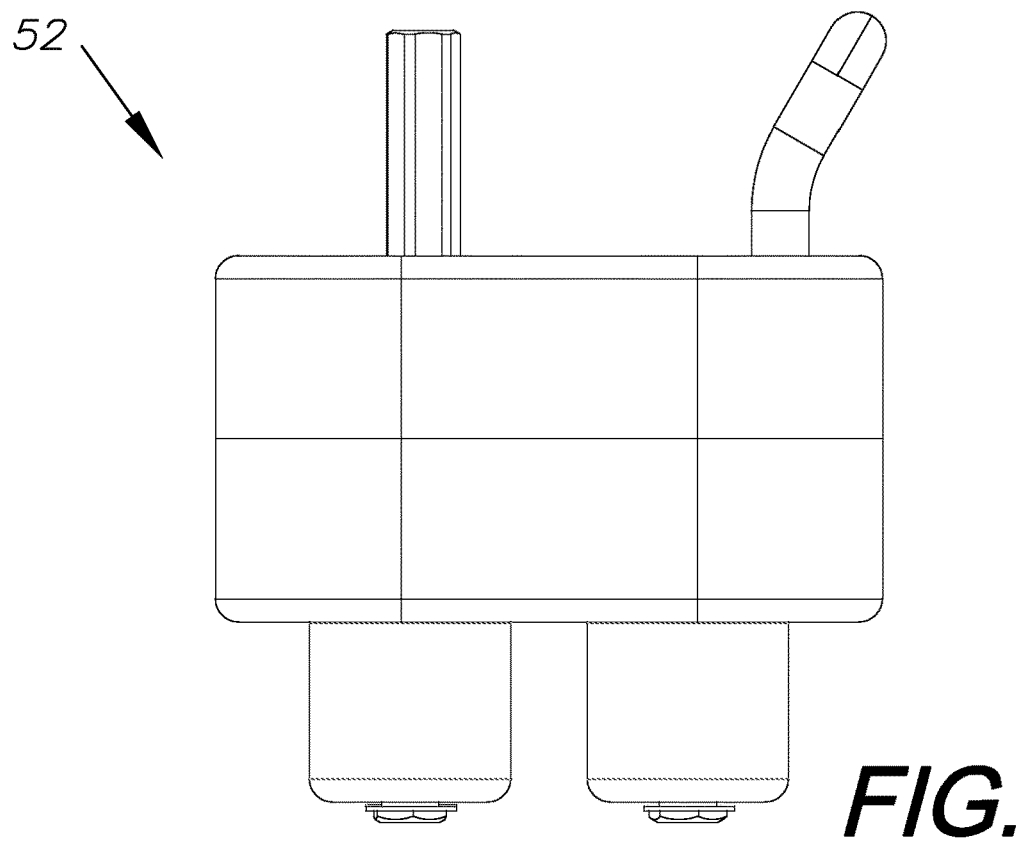
FIG. 14 is an end elevational view thereof.
Figure 15:
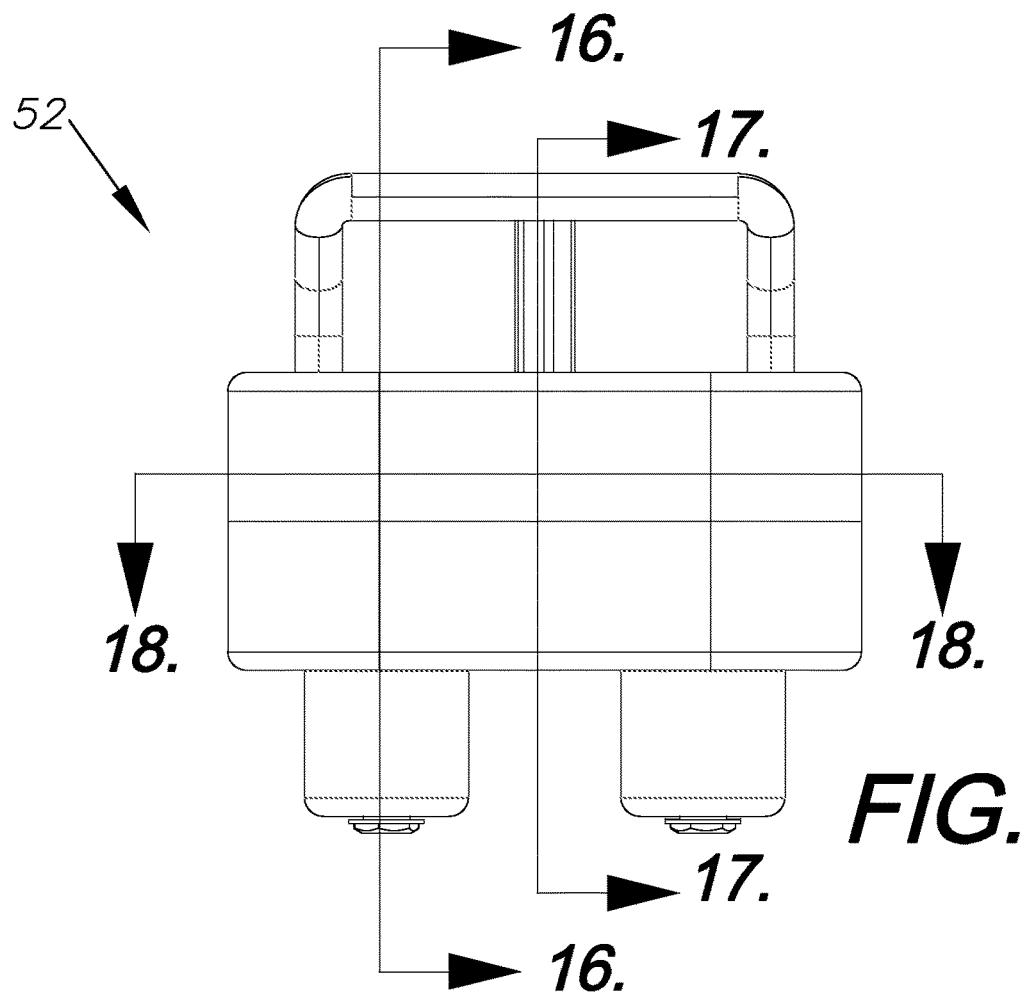
FIG. 15 is a side elevation view thereof.
Figure 16:
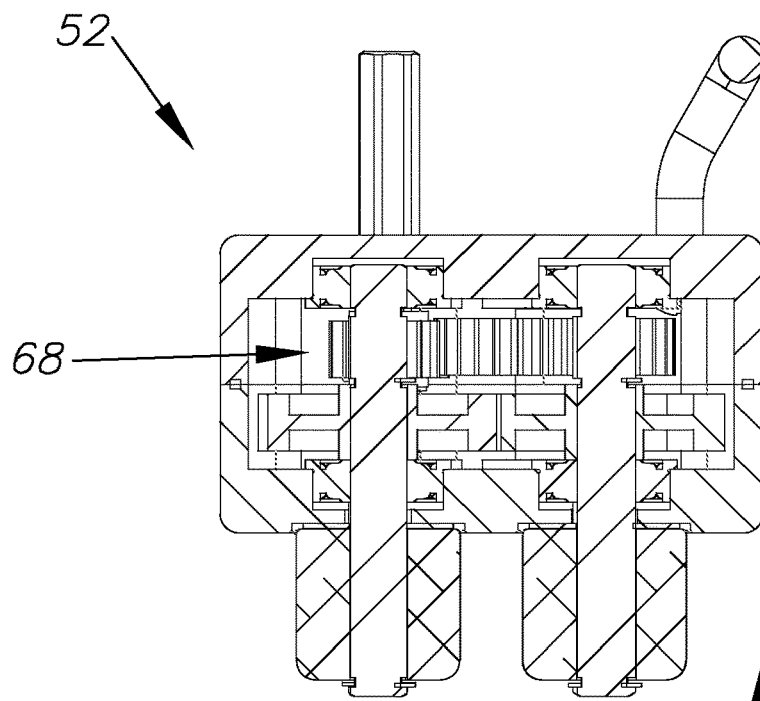
FIG. 16 is a cross-sectional view thereof taken generally along line 16-16 in FIG. 15.
Figure 17:
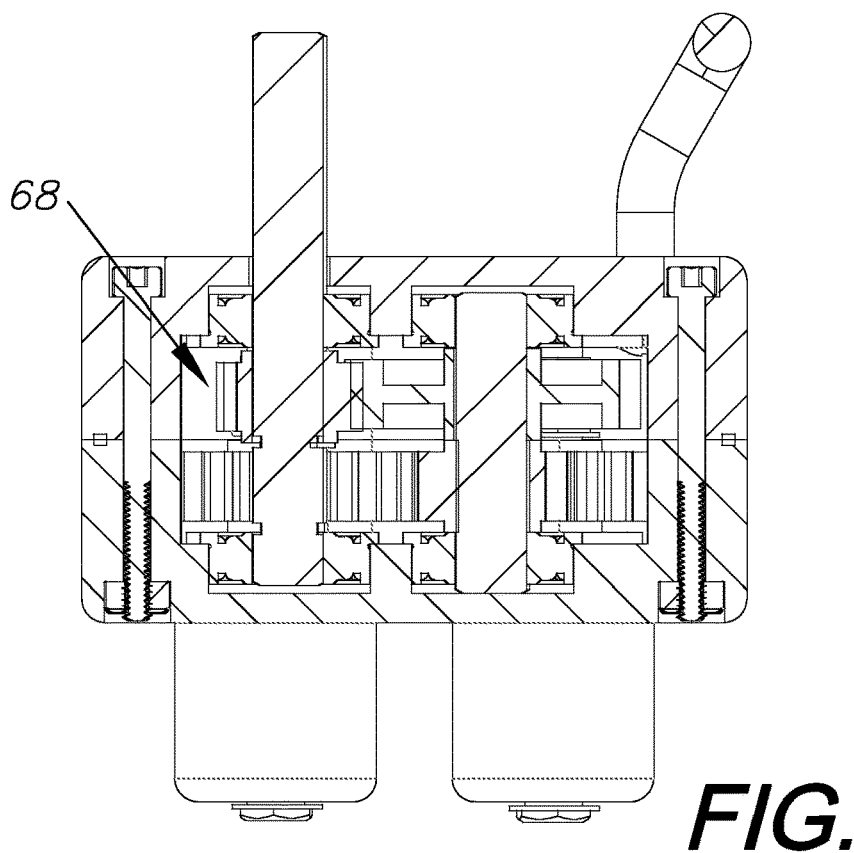
FIG. 17 is a cross-sectional view thereof taken generally along line 17-17 in FIG. 16.
Figure 18:
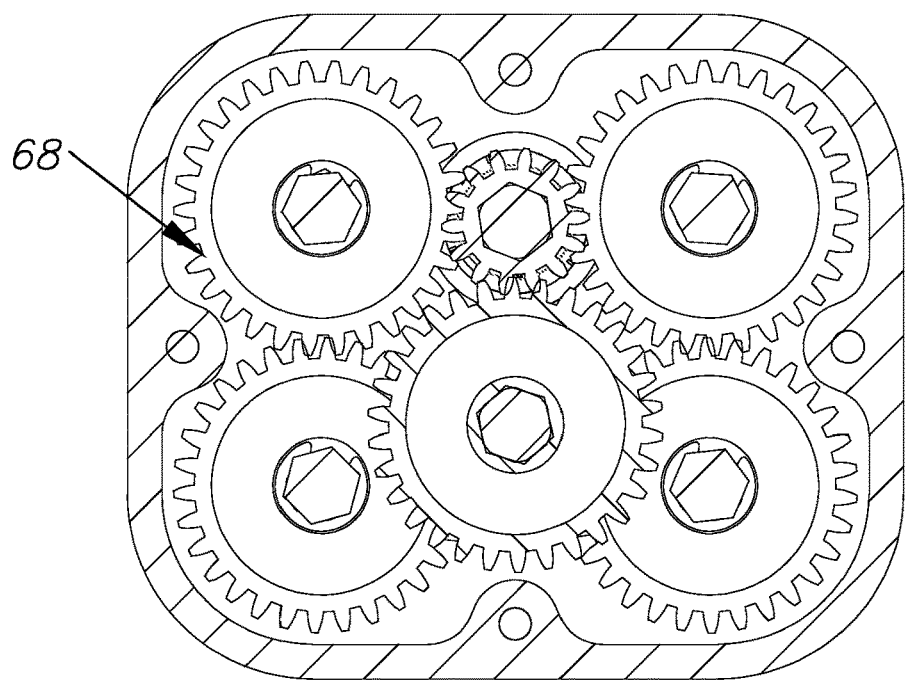
FIG. 18 is a horizontal, cross-sectional view thereof taken generally along line 18-18 in FIG. 17.
Figure 19:
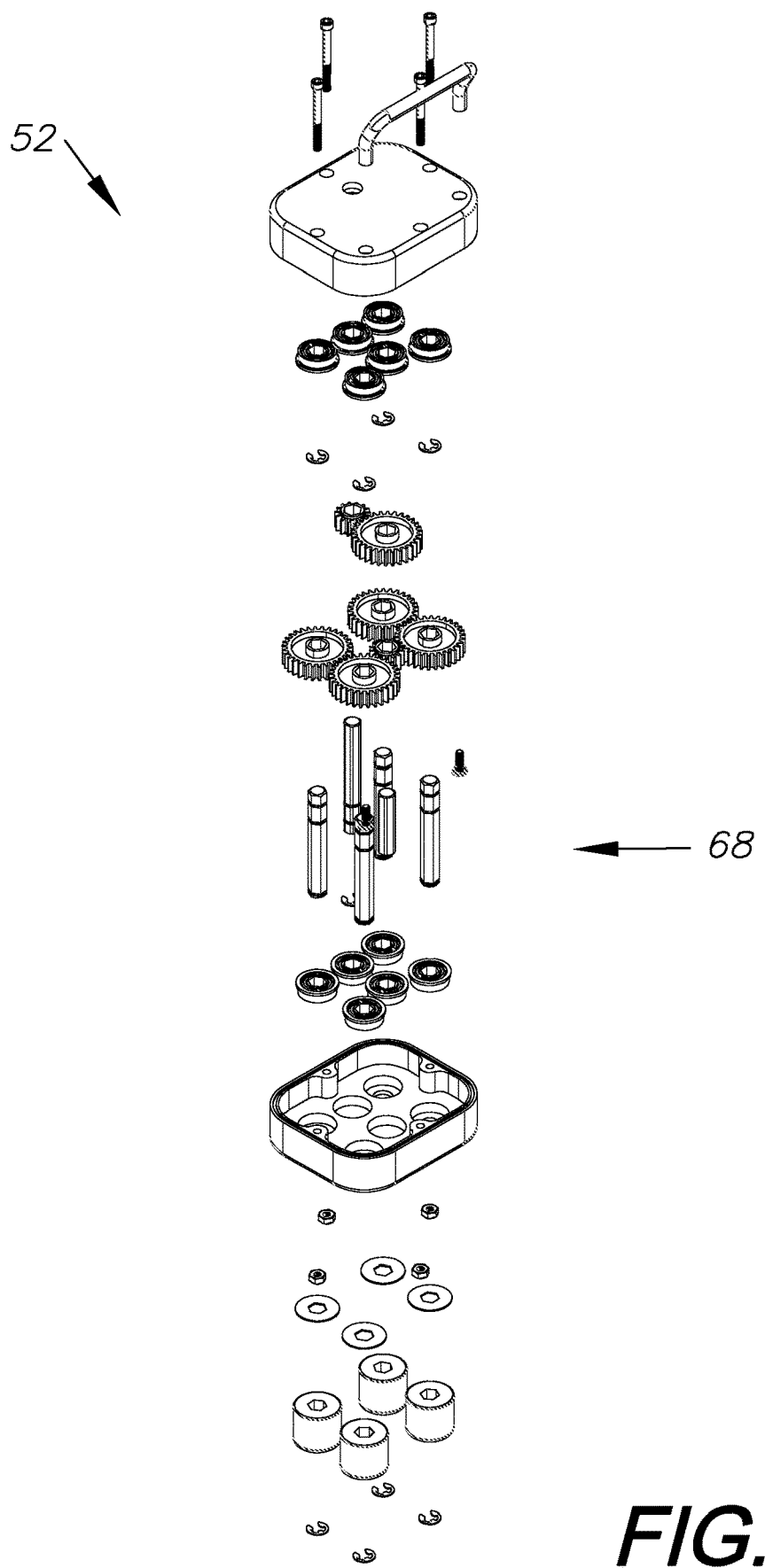
FIG. 19 is an exploded view thereof.

FIGS. 7-9 show a gypsum board panel 4 with a cut edge 6 compressed by the drywall joint tool 2 of the present invention.

IV. Alternative Embodiment Drywall Joint Tool 52

FIGS. 10-19 show a drywall joint tool 52 comprising a modified or alternative embodiment of the present invention with four rollers 68. Construction and operation of the modified embodiment tool 52 are otherwise similar to the construction and operation of the primary embodiment tool 2, as described above.

It is to be understood that while certain embodiments and/or aspects of the invention have been shown and described, the invention is not limited thereto and encompasses various other embodiments and aspects. The preferred and alternative embodiments outlined herein are examples of two ways to practice the present invention, but are not intended to limit the practice of the present invention in any way.

Having thus described the invention, what is claimed as new and desired to be secured by Letters Patent is:

1. A drywall joint tool for compressing a cut edge of a gypsum board panel with a panel lower surface, which drywall joint tool includes:
   a housing with upper and lower surfaces and a housing interior;
   a drivetrain including an input driveshaft extending from the upper surface of said housing and a pair of drive rollers depending downwardly from said lower surface of said housing;
   said drivetrain configured for reducing rotational speeds at said pair of drive rollers from an input driveshaft speed and increasing torque force from said input driveshaft to said pair of drive rollers;
   a panel edge constraint depending downwardly from said lower surface of said housing and configured for engagement by said gypsum board panel along said cut edge thereof;
   said panel edge constraint and said pair of drive rollers forming a slot therebetween with a minimum width corresponding to a compressed thickness of said gypsum board panel along said cut edge thereof; and
   said drywall joint tool being configured for simultaneously traversing and compressing said gypsum board panel in said slot along said cut edge;
   said panel edge constraint comprising a guide fence depending downwardly from said panel lower surface, said guide fence including a guide wall positioned in spaced relation from said pair of drive rollers;
   said guide fence is adjustably mounted on said lower surface of said housing and configured for adjusting a width of said slot;
   said panel edge constraint comprises an additional pair of rollers depending downwardly from said lower surface of said housing;
   said drivetrain drives both of said pair of drove rollers and said additional pair of rollers; and
   said drivetrain comprises multiple, drivingly interconnected gears.

2. The drywall joint tool according to claim 1, which includes:
   a handle mounted on and extending upwardly from said housing; and
   said handle being configured for gripping by an operator guiding said drywall joint tool along said cut edge of said gypsum panel board.

3. The drywall joint tool according to claim 1 wherein said housing comprises:
   an upper housing with said upper surface of said housing;
   a lower housing with said lower surface of said housing; and
   a housing interior between said upper and lower housings, said housing interior receiving said drivetrain.

4. The drywall joint tool according to claim 1 wherein said drivetrain comprises multiple drive belts and pulleys.

5. The drywall joint tool according to claim 1, which includes an electric drive motor incorporated in said housing and drivingly connected to said drivetrain.

6. A drywall joint tool for compressing a cut edge of a gypsum board panel, which drywall joint tool includes:
   a housing with upper and lower surfaces and a housing interior;
   a drivetrain including an input driveshaft extending from the upper surface of said housing and a pair of drive rollers depending downwardly from the lower surface of said housing;
   said drivetrain configured for reducing rotational speeds at said pair of drive rollers from an input driveshaft speed and increasing torque force from said input driveshaft to said pair of drive rollers;
   said drivetrain comprising multiple, drivingly interconnected gears;

a gypsum board panel edge constraint depending downwardly from said lower surface of said housing and configured for engagement by said gypsum board panel along said cut edge thereof;

said gypsum board panel edge constraint and said pair of drive rollers forming a slot therebetween with a minimum width corresponding to a compressed thickness of said gypsum board panel along said cut edge thereof;

said drywall joint tool being configured for simultaneously traversing and compressing said gypsum board panel in said slot along said cut edge;

a handle mounted on and extending upwardly from said housing;

said handle being configured for gripping by an operator guiding said drywall joint tool along said gypsum board panel cut edge; and an electric drill drivingly connected to said input shaft.

7. The drywall joint tool according to claim 6, which includes:

said panel edge constraint comprising a guide fence depending downwardly from a panel lower surface, said guide fence including a guide wall positioned in spaced relation from said pair of drive rollers.

8. The drywall joint tool according to claim 6, wherein said guide fence is adjustably mounted on said lower surface of said housing and configured for adjusting a width of said slot.

9. The drywall joint tool according to claim 6 wherein said panel edge constraint comprises an additional pair of rollers depending downwardly from said lower surface of said housing.

10. The drywall joint tool according to claim 6, wherein said drivetrain drives the pair of drive rollers and the additional pair of rollers.

11. The drywall joint tool according to claim 6 wherein said housing comprises:

an upper housing with said upper surface of said housing;

a lower housing with said lower surface of said housing; and a housing interior between said upper and lower housings, said housing interior receiving said drivetrain.

12. A drywall joint tool for compressing a cut edge of a gypsum board panel with a panel lower surface, which drywall joint tool includes:

a housing with upper and lower surfaces and a housing interior;

a drivetrain including an input driveshaft extending from the upper surface of said housing and a pair of drive rollers depending downwardly from said lower surface of said housing;

said drivetrain configured for reducing rotational speeds at said pair of drive rollers from an input driveshaft speed and increasing torque force from said input driveshaft to said pair of drive rollers;

a panel edge constraint depending downwardly from said lower surface of said housing and configured for engagement by said gypsum board panel along said cut edge thereof;

said panel edge constraint and said pair of drive rollers forming a slot therebetween with a minimum width corresponding to a compressed thickness of said gypsum board panel along said cut edge thereof; and said drywall joint tool being configured for simultaneously traversing and compressing said gypsum board panel in said slot said along said cut edge; and an electric drill drivingly connected to said input shaft.

13. The drywall joint tool according to claim 12 wherein said electric drill is variable speed reversible (VSR).

\* \* \* \* \*